Figure 1:
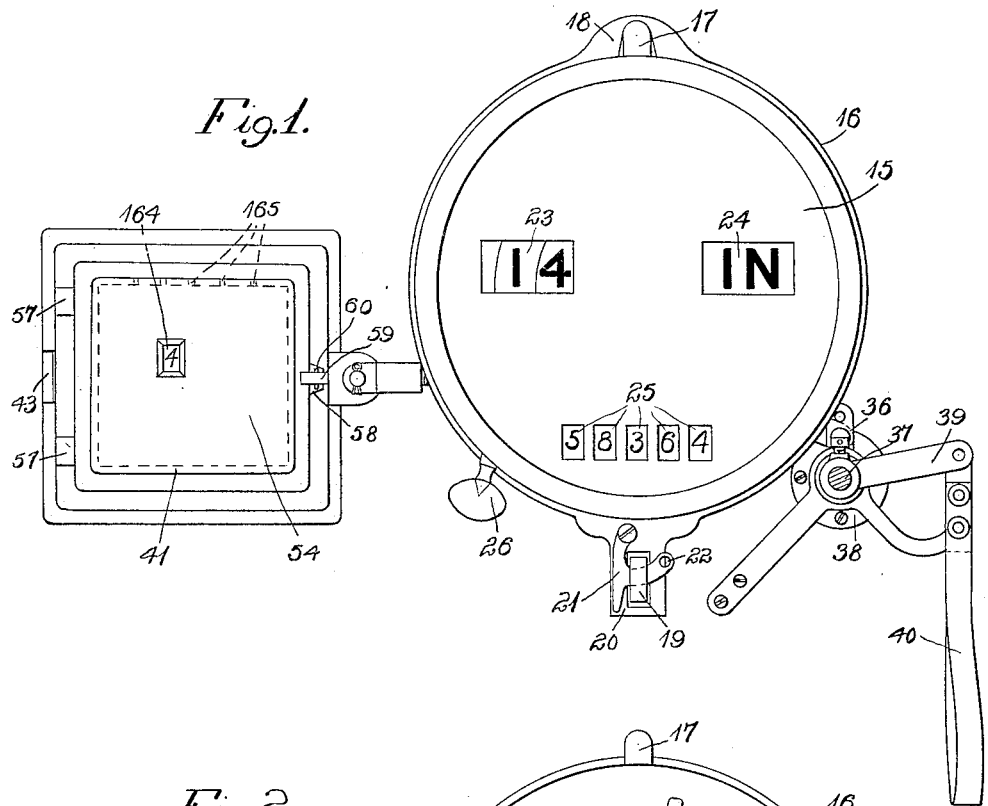

A. H. WOODWARD.
REGISTER MECHANISM.
APPLICATION FILED OCT. 25, 1909.

1,130,951.

Patented Mar. 9, 1915.
5 SHEETS—SHEET 1.

Witnesses:
George C. Higham.
Leonard E. Bogue.

Inventor
Arthur H. Woodward
By Bower & Williams
Attorneys

A. H. WOODWARD.
REGISTER MECHANISM.
APPLICATION FILED OCT. 25, 1909.

1,130,951.

Patented Mar. 9, 1915.
5 SHEETS—SHEET 2.

Witnesses:
George C. Higham.
Leonard E. Bogue.

Inventor
Arthur H. Woodward
By Brown & Williams
Attorneys

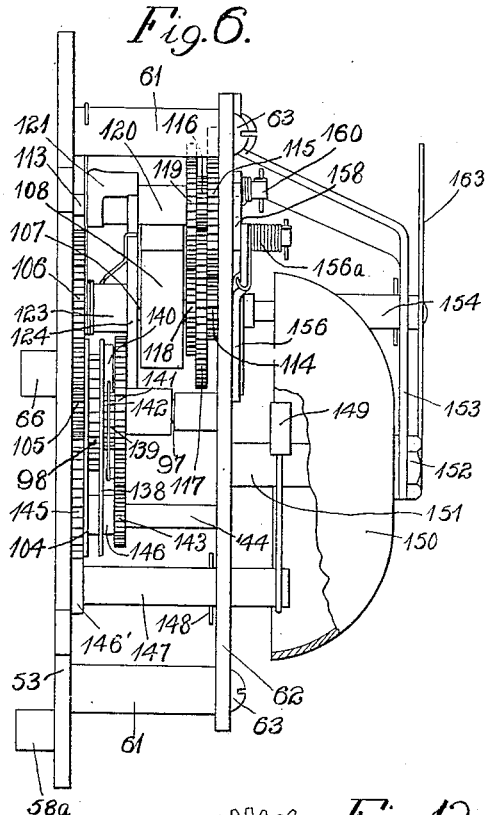
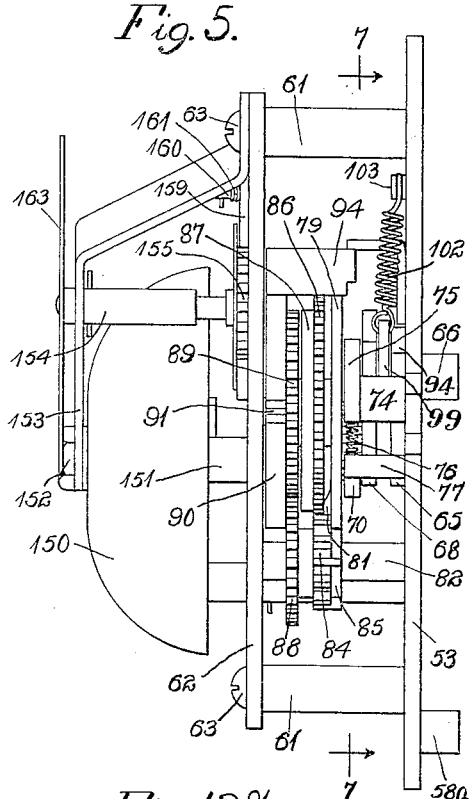
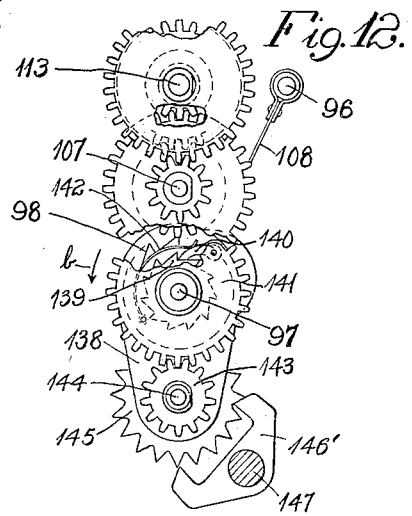
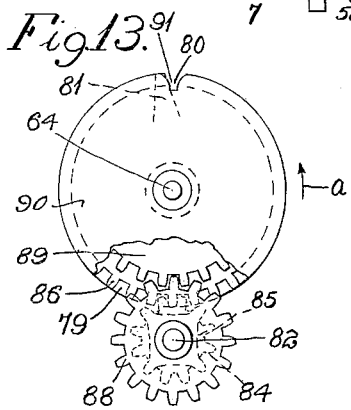

A. H. WOODWARD.
REGISTER MECHANISM.
APPLICATION FILED OCT. 25, 1909.
1,130,951.
Patented Mar. 9, 1915.
5 SHEETS—SHEET 4.
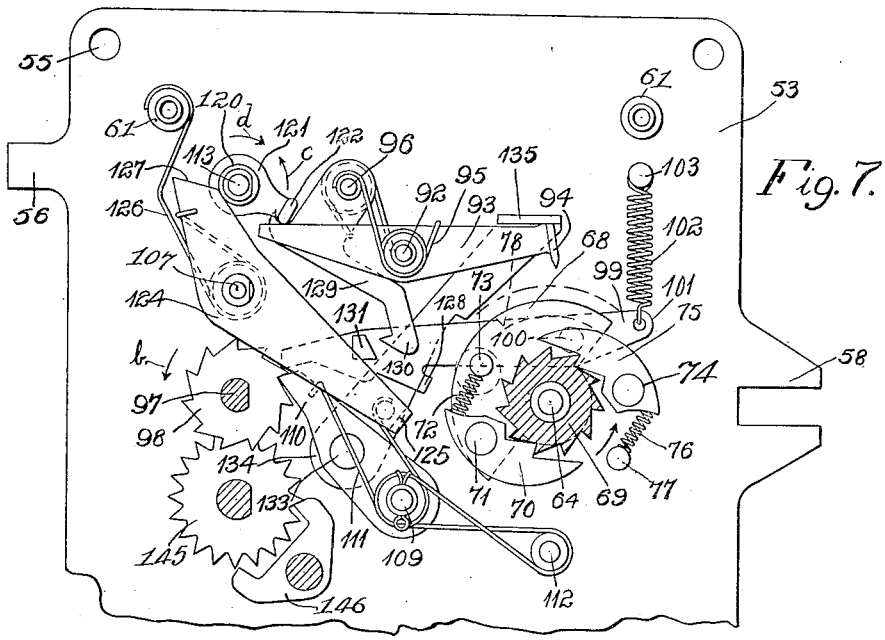
Fig. 7.
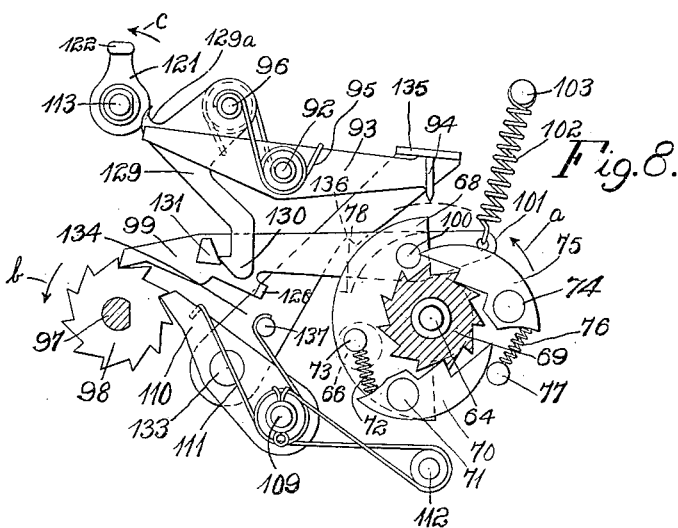
Fig. 8.
Fig. 11.
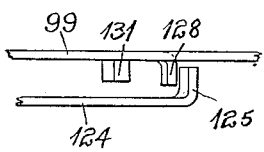
Witnesses:
George C. Higham.
Leonard E. Bogue.
Inventor
Arthur H. Woodward
By Brown & Williams
Attorneys

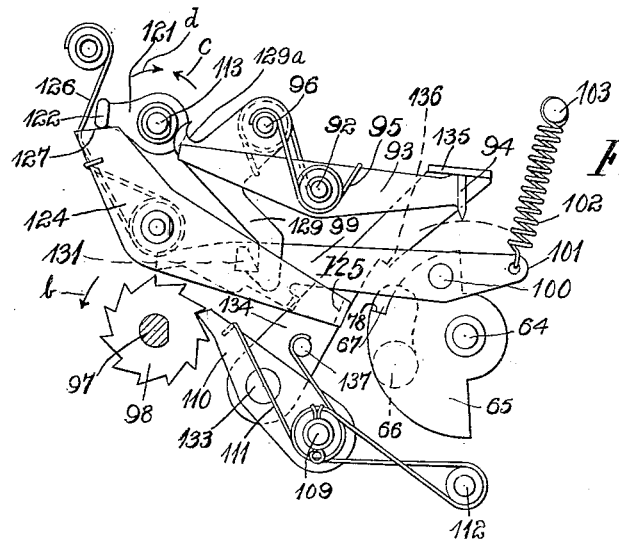

UNITED STATES PATENT OFFICE.

ARTHUR H. WOODWARD, OF CHICAGO, ILLINOIS, ASSIGNOR TO THE INTERNATIONAL REGISTER COMPANY, OF CHICAGO, ILLINOIS, A CORPORATION OF ILLINOIS.

REGISTER MECHANISM.

1,130,951. Specification of Letters Patent. Patented Mar. 9, 1915.

Application filed October 25, 1909. Serial No. 524,318.

*To all whom it may concern:*

Be it known that I, ARTHUR H. WOODWARD, a citizen of the United States, residing at Chicago, in the county of Cook and State of Illinois, have invented a certain new and useful Improvement in Register Mechanisms, of which the following is a full, clear, concise, and exact description, reference being had to the accompanying drawings, forming a part of this specification.

My invention relates to registering mechanism and contemplates what I choose to call a "register locking mechanism." This title is applicable because the mechanism which it designates automatically locks itself against operation at predetermined intervals, not necessarily regular, but, for purposes which will hereinafter appear, purposely irregular.

Although the device of my invention registers, it does not necessarily, of itself, indicate the individual registrations, but is designed to indicate that particular registration which terminates a predetermined count and locks the mechanism against further operation. Furthermore, the locking is merely temporary—that is, the mechanism locks itself for a short period after the interval in which a predetermined number of registrations have been made, and it is during this short period that the indication is made.

The device of my invention is adapted for association with a primary indicating register, which indicates each registration and totalizes them either in trip totals or sum totals or both, for instance such a register as is employed in street cars and analogous places for registering payments made to the conductor or other attendant. The device of my invention is adapted to be directly associated with this primary register in such a way that it will be operated by the regular registrations, and I contemplate connecting the locking mechanism of my invention and the primary register by direct mechanical means.

A primary register, as above referred to, is employed for the purpose of checking the payments made to a conductor on a street car or an attendant at a toll gate or similar place, each of the registrations being made by the conductor or attendant simultaneously with his collection of a fare or toll. Such devices are employed in large numbers by city traction and railway companies and form, therefore, not only a checking means for the employee himself, but, more particularly, a positive checking means, which the company may use, upon the integrity and honesty of the conductors and attendants which it employs to make the connections. The conductor or attendant having complete control of the operation of this primary registering device, it follows that it would be of absolutely no use unless there was some means for indicating to an inspector or, indeed, to the payer himself that the payment has been registered. Although railroad and traction companies employ detectives or inspectors to ride upon the various cars in disguise, these companies rely mostly upon the passengers to see that the payment of the fare by them is registered. Of course a passenger has no further actual interest in the matter except to obtain transportation for his fare, and it need not make any difference to him what becomes of his fare so long as he is entitled to ride on the car. For the passenger to see or insist that his fare is properly registered is to him, therefore, merely a matter of casual interest. It is apparent that this state of affairs may arise in many different enterprises, as at toll gates, etc., but to facilitate this description I will refer to the employment of my device in a street car, so that what will probably be its most popular use will be fully understood.

In order to encourage interest by a passenger to see that his fare is properly registered, I provide a device which gives an alarm or signal at predetermined intervals. Associated with this arrangement, the plan, in all probability, would be to offer a premium or reward, for instance a rebate in the way of ride tickets, to the particular passenger whose fare is the last in a predetermined block of fares which comprise a particular interval, as above outlined. In other words, when a registration has been made and that registration is immediately followed by the alarm or signal, the person who has just paid his fare is granted a premium or rebate, as pointed out. By this method each passenger upon paying his fare will be interested in seeing that his fare is registered to satisfy himself whether or not a reward should be his. In order that a conductor cannot follow the registration which initiates the alarm immediately by another registration to cut off the signal, the mechanism is such as to lock when the final registration of a block is made. The mechanism remains so locked for a short period, and it is during this period that the alarm or signal is given. It is thus that the mechanism which I have invented is a "register locking mechanism", and the conductor is constrained to wait until the alarm has been given before he can register another fare.

In order that the above arrangement may be most effective in practice it is, of course, necessary that the conductor be not aware beforehand of the particular registration which will effect the alarm, for otherwise he might conspire with a confederate to pay a fare at that time. I therefore contemplate irregularity in the length of the intervals or, in other words, a difference in the number of fares in each block which constitute an interval. I do not necessarily infer that there should be no repetition, in fact occasional repetition might be very effective, in the number of fares in a block, but it is the object of my invention to provide means whereby the number of fares in the various blocks can be differentiated so that it would be excessively difficult, if not impossible, for a conductor to ever acquaint himself with the system of the mechanism which he has in charge. The system of each device may, therefore, be considered a cycle in which a predetermined number of alarms are given, these alarms being so separated as to form a series of periods, and these periods may be so combined and permuted that, of a very large number of devices, no two cycles would be precisely alike, and a conductor could never be forewarned as to just when the mechanism which he has in charge will give an alarm.

The device of my invention is mechanically connected, as above stated, with the primary registering mechanism and may be said to consist primarily of three elements: first, step by step mechanism; second, apportioning means whereby the intervals between the alarms may be determined; and third, locking means. Secondarily, the device includes an alarm arranged to operate when the mechanism is locked and also means for timing the alarm period. The various mechanical contrivances employed go to the formation of these elements, auxiliary and probably less important elements being incidentally involved.

The mechanical embodiment of my invention has been designed with a view to simplicity and compactness, and with a view to simple, positive and effective operation, and is such as to be operated directly by the operation of the primary register with which it is connected. I employ preferably an audible mechanically operative alarm and associate therewith indicating means to show how often the alarm has been operated so as to form a check upon the number of rewards or rebates given out as reported by the conductor.

My invention is embodied in the device illustrated in the accompanying drawings, in which—

Figure 2:
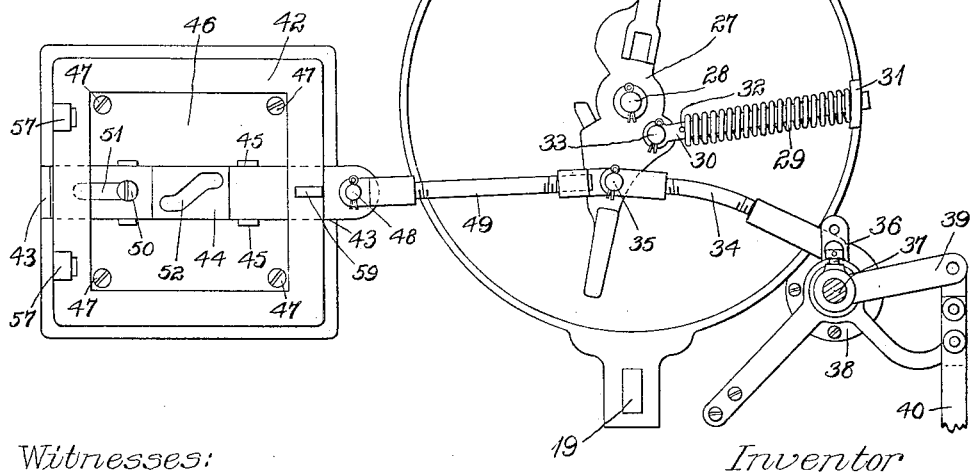
Figure 3:
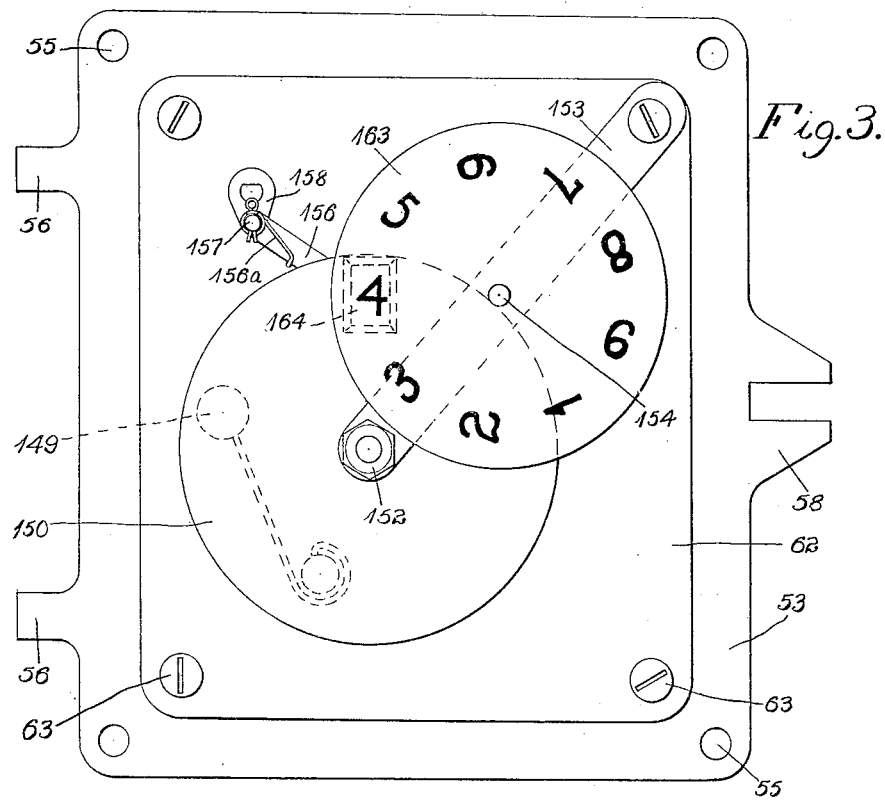
Figure 4:
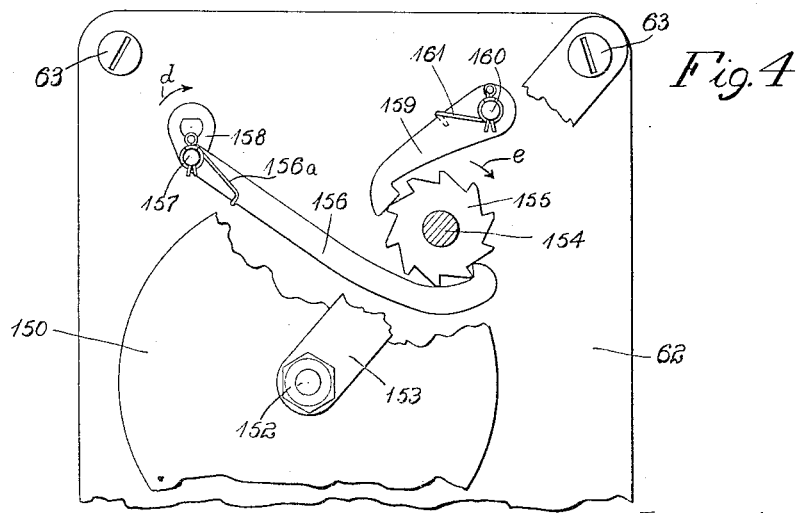

Figure 1 is an elevational view showing the device of my invention connected with a primary registering device; Fig. 2 is a view similar to Fig. 1, parts being removed to reveal the mechanical connecting and operating parts; Fig. 3 is an elevational view of the locking register mechanism removed from its supporting member, the casing being also removed; Fig. 4 is a view similar to Fig. 3, parts being broken away to show the mechanism for keeping count of the alarms; Fig. 5 is a side elevational view taken from the right side of Fig. 3; Fig. 6 is a side elevational view taken from the left side of Fig. 3, parts being broken away to disclose the construction; Fig. 7 is a sectional view taken approximately on the line 7, 7 of Fig. 5, parts out of the line of section being included to complete the various kinematic chains of parts; Fig. 8 is a view similar to Fig. 7, illustrating some of the parts shown in the latter figure in a different position; Fig. 9 is a view similar to Fig. 7, showing some of the parts of the latter figure in still another position; Fig. 10 is a view similar to Fig. 7, showing some of the connected parts not shown in the latter figure; Fig. 11 is a view illustrating a detail of construction empolyed in the arrangement particularly shown in the last four figures; Fig. 12 is an isolated face view of the gear train shown in side elevation in Fig. 6; and Fig. 13 is an isolated face view of the gear train shown in side elevation in Fig. 5.

Like reference characters are applied to the same parts throughout the various figures.

Referring first to Figs. 1 and 2, the primary register, whereby each collection is registered and then totalized in trips and also in sum, is shown at 15, this register being mounted upon a supporting back plate 16 by way of catch lug 17, which lug 18 of the register engages, and lug 19, which passes through the opening in the hasp lug 20, on the register proper, for the reception of the pivoted hook 21 which can be locked against removal by a padlock hung in the opening 22 thereof. This primary register has the trip total indicator 23, the trip indicator 24, and the sum total indicator 25. The actuating member for restoring the trip totalizing mechanism to zero and for changing the trip indicator is shown at 26. As shown in Fig. 2, this primary registering mechanism is provided with the main actuating member 27, which swings through a predetermined arc upon a central pivot 28, being normally held in the position shown in Fig. 2 by way of the expansion spring 29, which is coiled about rod 30 between lug 31 on the back plate and pin 32 on the rod, this rod being pivoted at 33 to the actuating member. The manner in which the operation of this actuating member secures the operation of the totalizing mechanism mechanically connected therewith is not concerned in the present invention, and no further explanation need be made as to that point. Suffice it to say, that each actuation of this member 27 in a counter-clockwise direction through a small arc, say, about thirty degrees, and its return in a clockwise direction to its normal position secures the registration of one fare in this primary registering device. The initial actuation of this member 27, that is its movement in a counter-clockwise direction, is secured by way of a connecting rod 34 pivoted at 35 to the lower arm of the member 27 and, at its other end, pivoted to one arm 36 of a bell crank lever, which is rigidly secured upon a shaft 37, this shaft, where the device is employed by a traction company, extending the entire length of the car so that registration may be made from any point. This shaft may be supported in any suitable manner, for instance in the bearing 38. The other arm 39 of the bell crank lever is provided with a hand strap 40, and it is apparent that a pull on this strap will swing the bell crank lever to effect initial actuation of the member 27. The return stroke of this member is secured by the expansion of the spring 29.

The locking register of my invention is illustrated in Figs. 1 and 2 at 41. The main supporting member of the locking register is in the form of a back frame 42 having suitable slots 43, 43, in which an actuating pull bar 44 is slidably mounted, this pull bar being further guided by forwardly extending lugs 45, 45 upon a central portion 46 of the back frame 42. Screws 47, 47 are employed to mount the structure. This pull bar 44 has pivoted thereto at 48 a connecting rod 49, the other end of which is pivoted to the pivot 35 on the actuating member 27. The motion of this pull bar 44 is further guided and defined by way of a screw 50, which passes through an elongated slot 51 in the pull bar and into the portion 46, this slot being straight and parallel to the motion of the bar and being of such length as to permit full actuation of the member 27. The pull bar 44 is provided with the actuating slot 52, which, in the main portion, is slanted so that horizontal reciprocation of the pull bar will effect vertical reciprocation or oscillation of an actuating stud having engagement in this slot, as will hereinafter be clearly pointed out. The various mechanisms which have been broadly mentioned in the introductory statements of this specification are mounted upon a back plate 53, as shown in Fig. 3, and are contained within a casing or cover 54 suitably secured to this back plate by means of screws passing through openings 55, 55 therein. The back plate 53 is provided with the lugs 56, 56, which engage under the arches 57, 57 at the side of the supporting frame 42 and also with the bifurcated lug 58, which the lug 59, extending from the other side of the frame 42, is arranged to pass, a padlock member or a cotter pin 60 passing through an opening in this lug 59 to retain the entire device rigidly against the supporting member. A lug 58ª may be provided at the back of the back plate to engage the inside of the frame 42 to assist in supporting the various mechanisms.

Extending forwardly from the back plate 53 are four properly disposed posts 61, 61 of equal length, which support the secondary supporting plate 62, screws 63, 63 being provided to secure this plate rigidly in position. Between the back plate and the secondary supporting plate the step-by-step mechanism and the directly associated parts are disposed, while the sounding device is disposed upon the outer face of the secondary supporting plate.

The various shafts and spindles are mounted in the two plates above referred to. The main shaft is indicated by the character 64. This shaft 64 has rotatably mounted thereon a plate 65 which has a stud 66, of substantial dimensions, extending from the rear thereof and through a segmental slot 67 in the back plate 53, this slot allowing for a substantial oscillation of the stud, with the plate 65, about the shaft 64. This stud extends into the slot 52 in the pull bar 44, and it is apparent that reciprocation of the pull bar will effect oscillation of the stud 66 and, consequently, of the plate 65 about the shaft 64. Mounted rotatably upon the shaft 64 above the plate 65, and oscillating with the plate 65, is a similar plate 68, between which and the plate 65 a dog is pivoted, as will be pointed out. Immediately above the plate 68 a ratchet 69 is mounted upon the shaft 64, this ratchet being engaged by the driving pawl 70, pivoted at 71 to the plate 68 and maintained in engagement with the ratchet by means of the expansion spring 72 disposed between the tail of the pawl and the post 73 on the plate 68. Pivoted upon a stud 74, which extends from the back plate 53, is a detent pawl 75, which is held in engagement with the ratchet 69 by means of a compression spring 76 disposed between the tail of the pawl 75 and the post 77 extending from the back plate 53. It is now seen that oscillation of the stud 66 by reason of the reciprocation of the pull bar 44 will result in the oscillation of the similar parts 65 and 68. This oscillation is just sufficient to bring the driving pawl into engagement with a succeeding tooth on the ratchet 69, the return movement serving to rotate the ratchet through an arc equal to one tooth, and the detent pawl 75 at all times preventing movement in the opposite direction. The plates 65 and 68 are here shown as semicircular, this being sufficient to accommodate the various parts carried thereby, the plate 65 being notched, as shown at 78, for a purpose which will hereinafter fully appear. Thus, the reciprocation of the pull bar advances the ratchet 69 step-by-step in the direction of the arrow $a$.

Mounted upon the shaft 64 immediately above the ratchet 69, to which it is secured, is the circular locking cam 79, which is provided with a notch 80 and a proximate tooth 81, the purpose of which will presently appear. Mounted at a short distance from the shaft 64 is a spindle 82, upon which is rotatably mounted a pinion 84, which is provided with a locking pinion 85, preferably integral therewith. This locking pinion coincides with the pinion 84 except for the omission of a certain number of teeth at regular intervals. In the spaces between the remaining teeth the locking cam 79 is arranged to engage, and it is apparent that during practically the whole of a revolution of this locking cam the locking pinion will be held stationary by this positive engagement. The tooth 81, which is provided upon the locking cam 79, is arranged for regular engagement with the pinion 84. This engagement can rotate the pinion 84 through a fraction of a revolution, since the adjacent tooth on the locking pinion may then enter the notch 80 in the locking cam 79. In the case herein shown for the purposes of illustration four teeth are provided, and it is therefore evident that each engagement of the tooth 81 with the pinion 84 will effect a quarter revolution thereof. These advances being imparted to pinion 84 intermittently when the tooth 81 and the notch 80 reach the spur and locking pinion, respectively, the pinion 84 will, at all other times, remain positively stationary because of the engagement between the locking pinion and the locking cam. This is the ordinary Geneva stop motion frequently employed in totalizing mechanisms. Movably mounted upon the shaft 64 over the locking cam 79 is a spur gear 86, which meshes also with the pinion 84. This gear is rotated intermittently as the tooth 81 comes in contact with the pinion 84. This gear 86 has a basic disk 87 secured thereto, and the two parts form what I term a change wheel or an interchangeable units wheel, the significance of which will hereinafter be made evident.

Rotatably mounted upon spindle 82 and securely associated with the pinion 84 is a pinion 88, this pinion being of larger diameter than the pinion 84 and being in mesh with a spur gear 89 rotatably mounted upon the shaft 64. Mounted upon the shaft 64 and carried with the gear 89 is the cam disk 90, which is circular and provided in its periphery with a notch 91, the function of which will be referred to hereinafter. It is now apparent that the velocity ratio between gear 86 and pinion 84 is different from the velocity ratio between gear 89 and pinion 88 and, pinions 84 and 88 rotating in unison, it follows that cam disk 90 will rotate at a speed different than that of the change wheel to which I have referred and, of course, from that of the locking cam 79, which rotates with each registration. The cam disk 90 is made of approximately the same diameter as the locking cam 79, as is also the addendum circle of the spur gear 86, and the notches 91 and 80 can, therefore, come into simultaneous alinement with any of the spaces in the spur gear 86. Pivotally mounted upon a post 92, which is suitably set between the back plate 53 and the secondary plate 62, is a follower 93, which is provided at its forward end with the follower blade 94, which is co-extensive in width with the locking cam, change wheel and cam disk, as clearly shown in Fig. 5. This follower blade rests upon the peripheries of these three members, either one two, or all of them, and is held in this normal position, that is, the position shown in Figs. 8 and 9, by means of a spring 95, coiled about the post 92 and securing its leverage against post 96, set between the two plates 53 and 62, from which post the spring extends. When the notches 91 and 80 and a space in the change wheel come into simultaneous alinement with the blade 94, the spring 95 causes the follower to drop into these notches to effect the positive locking of all the mechanisms directly connected therewith, as will later be described. It is while these mechanisms are so locked that the alarm or signal is automatically given.

I contemplate the employment of an alarm which will be released for operation immediately when the notches in the cam disk, locking cam and change wheel register simultaneously with the follower blade. I have herein shown a mechanical alarm. In order that this mechanical alarm may be under tension at this particular time and in order that it may be brought under such tension in the simplest and most effective manner, I provide means whereby the registrations of a block of collections automatically wind the operating spring of the alarm mechanism. When the alarm is to be given it is necessary merely to release the alarm mechanism so that the spring may operate. As before stated, the blocks of registrations are not uniform, and it is apparent that, unless further provision is made, the alarm mechanism would be wound to different degrees in the different registering intervals. To obviate this I provide means whereby the alarm is wound properly and sufficiently in a minimum interval and, associated therewith, means whereby the winding mechanism will cease to be effective when the alarm mechanism is wound to that extent, regardless of whether more registrations are necessary to complete the block or not. This mechanism will now be taken up for description.

Rigidly secured upon the spindle 97, which is mounted between the plates 53 and 62, is a ratchet 98, this ratchet being arranged to co-act with dog 99, to which I have heretofore incidentally referred as being pivoted between the plates 65 and 68 on the shaft 64. This pivot is indicated at 100. The tail 101 of this dog is connected by means of a tension spring 102 with a stud 103 on the back plate 53, and by this means the dog is normally maintained in engagement with the ratchet 98. The oscillation of the plates 65 and 68 which has heretofore been referred to is effective in rotating this ratchet and its shaft in the direction of the arrow b. Also securely mounted upon the spindle 97, but distanced from the ratchet 98 by means of a separating piece 104, is a pinion 105, which meshes with a spur gear 106 securely mounted upon the spring shaft 107, which, in turn, is mounted between the back and secondary plates, as has been described with reference to the other shafts. A spiral spring 108 surrounds the shaft 107, one end of the spring being secured to the shaft, and the free end of this spring is secured conveniently to the post 96. Mounted upon the pivot post 109, which is set between the back and secondary plates, is a detent pawl 110, which is held in constant engagement with the ratchet 98 by means of a spring 111, coiled about the post 109 and securing its purchase by its connection with post 112, as shown in the drawings. It is now apparent that the oscillation of the plates 65 and 68 to reciprocate the dog 99 gradually winds the spring 108 by a step-by-step action.

In order that the winding of the alarm mechanism may be properly timed and limited as has heretofore been pointed out, I provide mechanism as follows: Near the shaft 107 a parallel shaft 113 is mounted in the back and secondary plates. This shaft 113 is operatively connected with the shaft 107 and is geared down by way of a gear train 114, 115, 116, 117, 118, 119, pinion 114 being rigidly secured to the shaft 107 and gear 119 being secured to the sleeve 120 rotatably mounted on shaft 113. This sleeve 120 carries the dog 121, which has a forwardly extending lug 122, and it is apparent that this dog will respond in movement to both the winding and the running down of the alarm system. Carried upon a sleeve 123, which is rotatably mounted upon the shaft 107, is the lever 124, one arm of which extends over the dog 99, and is provided at its end with the rearwardly extending lug 125. The other arm of the lever extends in the opposite direction and, by way of a spring 126, which finds purchase on one of the posts 61 and is coiled about the sleeve 123, is normally held against sleeve 120 on the pivot post 113 as a convenient abutment. The tail of the lever 124, that is, the part upon which the spring 126 operates, has a contact surface 127, which is arranged for engagement by the upwardly extending lug 122 of the dog 121. When the alarm mechanism is being wound, the dog 121 moves in the direction of the arrow c and, at the instant that the alarm mechanism has been wound to the proper extent, this engagement between the lug 122 and the contact surface 127 takes place to move the lug 125 on the other end of the lever 124 into the path of a forwardly extending lug 128 on the dog 99. As will be hereinafter pointed out, the lug 128 will be in position to be engaged by the lug 125 at this time. This will move the dog 99 out of engagement with the ratchet 98. Mounted upon the post 96 is an anchor 129, the lower end of which is provided with a hook 130, which is held toward a boss 131 on the dog 99 by means of the free end of the spring 95, which is coiled about the post 96 and which has already been referred to as used for another purpose. The relation between this anchor and the dog 99 during the winding of the alarm mechanism, that is, while the dog advances in the direction of the arrow c, is shown in Fig. 8. As the dog 99 reciprocates, the anchor 129 is free to travel with it, as shown in Fig. 8. When, however, the dog 121 reaches its farthermost position in traveling counter-clockwise, the lug 125 of the lever 124 engages the lug 128 on the dog 99, lifting the dog out of engagement with the ratchet 98 and into engagement with the anchor 129, by way of the boss 131. The dog 121 and the dog 99 are so relatively timed that the lug 128 on the dog 99 will, in its reciprocating movement, be in the path of the lug 125 when the latter is raised, as has heretofore been explained. The dog 99 being thus thrown out of engagement with the ratchet 98, the parts assume the positions shown in Fig. 9, from which it will be clear that the anchor 129 is free to swing on the post 96 to respond to the movements of the dog 99 as more registrations are made, the latter being always held out of engagement with the ratchet 98. Thus, all registrations after this actuation of the lever 124 are ineffective in securing any further winding of the alarm spring. While these further registrations are being made the ratchet 98 is engaged by the detent pawl 110 to prevent any movement thereof.

I shall now describe the mechanism for releasing the alarm device at the end of a block of registrations. Pivoted at 133 to to the pawl 110 is a connecting piece 134, which extends upwardly to the follower 93 and is there provided with an upwardly extending flange 135 arranged to be engaged by the upper side of the follower, as clearly shown in Figs. 7, 8 and 9. This connecting piece 134, at the side nearest the oscillating part 65, is provided with a notch 136 which, when the follower 93 is permitted to drop, is brought into engagement with the notch 78 in the plate 65 so as to operatively connect these two parts. The free end of the spring 111, which has already been referred to, is connected with a stud 137 on the connecting piece 134, so that this action just pointed out may follow. Thus, after the connecting member 134 is allowed to drop, the next registration, oscillating the plate 65, will, upon the return movement, cause the co-action of the two notches to lift the detent pawl 110 out of engagement with the ratchet 98. This position is shown in Fig. 10. It is seen that the spring of the winding mechanism is then free to unwind. This locking of the two notches prevents complete return of the oscillating plate 65 and an operator is therefore unable to secure the advance of the ratchet 69. Thus the mechanism is locked against operation.

To operate the alarm and to properly restrain the unwinding of the spring 108 an escapement train is provided. This arrangement is as follows: Mounted upon the spindle 97 and operatively carried with the ratchet 98, but being distanced therefrom by a spacing plate 138, is a ratchet 139, with which a pawl 140 pivoted to a spur gear 141, loosely mounted on the shaft 97, is held in engagement by means of a spring 142. Thus, when the alarm mechanism is being wound, the ratchet 98 and the ratchet 139 move together in the direction of the arrow $b$ without in any way effecting the spur gear 141. This spur gear meshes with the pinion 143 mounted on a spindle 144, this pinion being operatively connected with an escapement wheel 145 by way of a sleeve 146. The escapement wheel 145 is engaged by a pallet piece 146' secured upon a verge 147 passing forwardly through the secondary plate 62. Lateral displacement of this verge is prevented by means of a cotter pin 148 passing therethrough, as shown in Fig. 6. At its forward end this verge 147 is provided with a spring mounted hammer 149, both the verge and hammer being covered by a bell 150 mounted on a supporting post 151 in such position particularly that the hammer may engage the inside thereof in accordance with the oscillations of the verge. The verge 147 and the hammer 149 serve not only as a convenient means to sound alarm, but serve as well as an escapement for timing the alarm.

As has been before pointed out, the dog 121 will rotate in a clockwise direction when the alarm is being given. The lug 122 on this dog is arranged also for engagement with an extension 129$^a$ on the anchor 129 and also with the tail of the follower 93. These engagements take place when the alarm mechanism has run down and when the dog 121 has reached its farthermost position in the clockwise direction. The engagement of the lug 122 with the extension 129$^a$ lifts the hook 130 out of engagement with the boss 131, so that the dog 99 may drop back into engagement with the ratchet 98. The engagement of the lug 122 with the tail of the follower 93 lifts the follower out of engagement with the notches in the locking cam, the cam disk and the change wheel, and also lifts the connecting piece 134 out of engagement with the oscillating plate 65. This particular arrangement is shown in Fig. 7. Detent pawl 110 is permitted to drop back into engagement with the ratchet 98 and this restores the mechanism to its initial position ready for further registrations.

The bell 150 is held upon the post 151 by means of a bolt or nut 152, which clamps into place a yoke 153 passing over to the corner of the secondary plate 62 and under the head of the retaining screw 63, hereinbefore referred to. Mounted between the secondary plate 62 and the yoke 153, near the bell 150, is a spindle 154, and upon this spindle is securely mounted, directly over the plate 62, a ratchet 155. This ratchet is engaged by an actuating dog 156, a spring 156$^a$ being provided to maintain such engagement, which is pivoted at 157 to a crank 158 which, in turn, is keyed upon the shaft 113 upon which, it will be remembered, the dog 121 is secured. The dog 121 rotates in a clockwise direction, arrow $d$, when, and only when, the alarm operates. This movement of the dog 121 and consequently of the shaft 113 advances the ratchet 155 one unit in the direction of the arrow $e$ by way of the dog 156, this dog being so formed that movement of the shaft 113 in the opposite direction has no effect on the ratchet. This arrangement is particularly shown in Fig. 4. A detent pawl 159 is pivoted on a stud 160 on the plate 62 and is held in engagement with the ratchet 155 by means of the spring 161. The shaft 154 is held against lateral displacement by means of a cotter pin extending therethrough, as shown in Fig. 6, and the forward end of the shaft has secured thereto a disk 163, upon which a series of numbers or other indicating characters, corresponding in number to the teeth of the ratchet 155, are placed. The disk is of such diameter that these numbers may come, one by one, before an opening 164 in the casing or cover 54, (Fig. 1), as indicated in dotted lines in Fig. 3. By this arrangement it is apparent that count of the number of times that the alarm has been released may be kept. As indicated in Fig. 1, sound holes 165, 165 are provided in the casing for obvious purposes.

The construction and operation of the various mechanisms having now been described, I shall append a brief summary of the operation of the device as a whole and will also explain the various results secured: The registrations in the primary registering device reciprocate the pull bar 44 and consequently move the locking cam 79 in a counter-clockwise direction. The normal position of the oscillating plate 65 is shown in Fig. 7, and its extreme position is shown in Figs. 8 and 9. Fig. 10 shows the oscillating plate on its return movement. During the rotation of the locking cam 79, the intermittent engagement of the tooth 81 carried thereby causes the simultaneous rotation, but at different speeds, of the change wheel and the cam disk 90. It now appears that the locking point is that instant when the notches 91 and 80 and a notch in the change wheel register simultaneously with the follower blade 94. The change wheel herein shown is such that at no time will it interfere with the drop of the follower if the notches 90 and 81 are in register therewith. This, however, is merely a special case and, for the purposes it is contemplated that the basic disk 87, which has been referred to, be built up at any desired point or points so that the dropping of the follower can be prevented at any desired time. In the structure which is herein shown for the purposes of illustration, the ratchet 69 has eleven teeth, and it follows that with every eleventh registration the notch 80 will be in alinement with the follower blade 94. From previous description it is clear that the cam disk 90 rotates but a fraction of a revolution with each complete revolution of the locking cam 79. If it be assumed for the purposes of illustration that thirteen revolutions of the locking cam are required for one complete revolution of the cam disk 90, it follows that notches 91 and 80 will be in alinement with the follower blade 94 every 143 registrations. And since, in the embodiment herein shown, the change wheel is such as not to interfere with the dropping of the follower blade at any time, it follows that an alarm will be given every 143 fares. It is clear that if, when the notches 91 and 80 are in alinement with the follower blade 94, the registering part of the change wheel be built up to the extent of the addendum of the gear 86, any movement of the follower blade 94 will be prevented. It is further apparent that this basic disk of the change wheel could be built up in any way to interfere with the dropping of the follower blade at any time that the notches 91 and 80 are in alinement. Assuming, for the purposes of illustration, that the change wheel has thirty-one notches, that is, the gear 86 has thirty-one teeth, it follows that the complete cycle is 31×143, or 4433 registrations. So it follows that the intervals between locking points are multiples of 143. Within the limit of 4433 registrations to the cycle any variation in the number of periods can be obtained by merely building up the basic disk of the units wheel.

To summarize, it may be said that a theoretical cam is divided into thirty-one spaces each composed of 143 units to make up the total cycle of 4433 registrations. If there is one operating point, for instance, a notch, the register will lock once for 4433 registrations. If two notches are provided, it will lock twice in that time, and so on so long as the blocks are multiples 143.

The above numerical discussion is provided merely for the purpose of illustration, and I wish it to be understood that I contemplate any combination and permutation of intervals. In fact, it is the very object of my invention to provide for such scope. The number of teeth in the spur gears and ratchets above mentioned are merely exemplary, and I do not wish to be understood as limiting myself to any particular number. Thus, while the registrations are being made the follower blade rides upon the periphery of the cam disk, change wheel and locking cam, and the dog 99 is operated to rotate the ratchet 98 whereby the spring of the alarm mechanism is wound. During this period the dog 121 rotates in a counter-clockwise direction and, at that instant when it is wound sufficiently, the lug 122 of the dog 121 engages the lever 124 to throw the dog 99 out of contact with the ratchet 98 and into engagement with the anchor 129. It is possible that this might be a locking point, since, as before stated, the dog 121 travels its full stroke during a minimum period. However, if the change wheel is such that the current interval is longer, it is clear that the dog 99, being held by the anchor 129, may reciprocate in accordance with the registrations, without in any way affecting the alarm mechanism. While the follower blade 94 rides upon the cam peripheries, the connecting piece 134 is held out of the path of the oscillating plate 65 and, consequently, the detent pawl 110 is left in engagement with the ratchet 98 to prevent release of the alarm mechanism. When, however, a locking point is reached, the follower blade 94 drops and the connecting piece 134 falls into operative relation with the oscillating plate 65, so that the return stroke on that registration lifts the detent pawl 110 out of engagement with the ratchet 98 so that the alarm mechanism is free to operate. This also locks the mechanism. While the alarm mechanism runs down the dog 121 rotates in a clockwise direction, as has heretofore been described, and finally the lug 122 thereon comes into engagement with the anchor 129 and the tail of the follower 93. The engagement between the lug 122 and the anchor 129 restores the dog 99 to the ratchet 98, and the engagement between the lug 122 and the tail of the follower 93 raises the connecting piece 134 out of contact with the oscillating plate 65, so that the detent pawl 110 may once more drop into engagement with the ratchet 98. Thus the alarm mechanism is stopped, the parts being then in the position shown in Fig. 7. The engagement of the connecting piece 134 and the plate 65 prevents complete return of the plate so that the pawl carried thereby can not catch the succeeding tooth of the associated ratchet. This prevents another registration until the alarm mechanism has run down, so that an attendant is unable to cut off the alarm by immediately making another registration. The sounding of the alarm requires the same interval each time, as the spring is wound to the same tension and the dog 121 must travel through the same angular distance before the parts are unlocked. It is evident that the length of time that the mechanism is to remain locked may be predetermined in accordance with operating conditions. The parts are now in position for the beginning of another interval. As the winding of the alarm mechanism takes place, which may or may not constitute an entire interval, as has heretofore been explained, the parts are in the position shown in Fig. 8, the dog 121 then rotating in the direction of the arrow $c$. The position of the parts, when the alarm mechanism has been wound sufficiently and when the actuating dog is thrown out of engagement with the alarm ratchet, is shown in Fig. 9. Fig. 10 shows the position of the parts when the alarm mechanism is running down and the dog 121 is, consequently, rotating in the direction of the arrow $d$, the particular position being just before the lug 122 actuates the cam follower and the anchor. By way of the ratchet 139 the escapement mechanism heretofore described is connected with the alarm mechanism so as to ring the bell and restrain the alarm spring when the alarm ratchet has been released.

It is to be noted that the particular registration which secures the locking, as pointed out in the foregoing summary, is that registration which terminates a particular period or block of registrations. As pointed out, each registration secures a complete oscillation of the plate 65. The initial stroke of each oscillation secures the advance of the winding mechanism and of the cam mechanism. The return stroke of that particular registration which terminates a block secures the release of the alarm ratchet from the associated detent pawl, but is curtailed so as not to secure advance on the feeding ratchet. Thus, all the operations which have been described are secured by way of the simple oscillation of the actuating member of the primary registering device, so that the employment of the locking register of my invention entails merely the simple mechanical connection between it and the primary register used in any event.

The device of my invention may be used effectually as a primary register when individual indications are not required and in such a case a tally is made at each of the locking points. It might also be here mentioned that an electrically operated alarm may be substituted for the mechanical alarm herein shown where the former could be used advantageously.

It is to be noted that all primary registers commercially used in the present day are operated either by an oscillatory or a reciprocatory movement and it is clear that the device of my invention may be readily adapted to all these primary devices. In order that the required oscillatory movement of the actuating stud of my device may be secured whatever be the stroke of the associated primary register, the ends of the actuating slot in the pull bar are elongated and disposed parallel to the movement of the bar, thus permitting a dwell of the actuating stud until the stroke or throw of the primary device is completed.

I claim as new and desire to secure by Letters Patent:

1. In combination, totalizing registering mechanism, means for locking said mechanism against operation at predetermined counts and means for automatically causing the release of said mechanism so that it may proceed as before.

2. In combination, totalizing registering mechanism, and means for automatically locking said mechanism against operation at predetermined counts and for automatically unlocking said mechanism.

3. In combination, manually operated totalizing mechanism and means operable after one setting thereof for locking said mechanism against operation for a predetermined period, said locking occurring a plurality of times, each time at a predetermined count.

4. In combination manually operated totalizing mechanism, means operated at a plurality of predetermined counts for locking said mechanism against operation for a predetermined interval of time.

5. In combination, manually operated totalizing registering mechanism and means for automatically locking said mechanism against operation at predetermined counts, and for automatically unlocking said mechanism.

6. In combination, manually operated step by step totalizing registering mechanism and means for locking said mechanism against operation at predetermined counts and for automatically unlocking said mechanism.

7. In combination, manually operated step by step totalizing registering mechanism and means for automatically locking said mechanism against operation for a predetermined period of time at predetermined counts.

8. In combination manually operated totalizing registering mechanism, means for locking said mechanism against operation at predetermined counts and means for automatically releasing said mechanism for further operation.

9. In combination, totalizing registering mechanism, means for locking said mechanism against operation for a predetermined period of time at predetermined counts and means for giving a signal during such period.

10. In combination, registering mechanism, means for automatically locking said mechanism against operation at predetermined counts for a predetermined period of time and permutative means for determining said counts.

11. In combination, registering mechanism and means for giving a signal at the end of each of a series of different predetermined counts, said series of counts comprising a closed cycle.

12. In combination, registering mechanism, signaling mechanism for cyclically giving a signal only at the end of each of a series of different predetermined counts.

13. In combination, registering mechanism, signaling mechanism giving a signal at the end of each of a series of different predetermined counts, said series recurring cyclically and permutative means to determine said counts.

14. In combination, registering mechanism, means for locking said mechanism against operation at the end of each of a series of different predetermined counts, alarm mechanism and means whereby said alarm operates when said registering mechanism is locked.

15. In combination step by step mechanism, cam mechanism operated thereby, and means controlled by said cam mechanism for locking said step by step mechanism at the end of each of a series of different predetermined counts, said locking means having means for automatically releasing said locking means.

16. In combination, step by step means, registering means for registering successive steps of said step by step means, and means for locking said registering means upon the registration of predetermined counts of operation of said step by step means.

17. In combination, step by step operating means, a single registering device for registering all the operations of said step by step means and means to lock said registering device upon the registration of predetermined counts.

18. In combination, step by step operating means, a single registering device for registering all the operations of said step by step means and means to lock said registering device upon the registration of the last of each of a series of different predetermined counts.

19. In combination, step by step operating means, a plurality of registers, one of said registers registering all the operations of said step by step means and another of said registers registering only certain predetermined ones of said counts and means to lock the first register upon registration of said predetermined counts.

20. In combination, step by step operating means, a plurality of registers, one of said registers registering all the operations of said step by step means and another of said registers registering only the last one of a series of different predetermined counts and means to lock the first register upon the registration of said last counts of the series.

21. In combination, manually operated registering mechanism, spring operated alarm mechanism, means whereby operation of said registering mechanism winds said alarm mechanism, and means for releasing said alarm mechanism at the end of each of a series of different predetermined operations, said series being determined by a single setting of said release means.

22. In combination, manually operated step by step mechanism, means for locking said step by step mechanism, means for actuating said locking means at predetermined counts, spring operated alarm mechanism, and means for winding said alarm mechanism during each of said intervals between said counts.

23. In combination, a registering means, an alarm operated upon the registration of different predetermined counts and a second register for registering only the completion of said different predetermined counts.

24. In combination, registering mechanism, means for locking said mechanism against operation at different predetermined counts, and means mechanically connected with said first named means for registering the number of locking points.

25. In combination, an alarm, means for operating said alarm at different predetermined counts, and means mechanically connected with said first-named means for registering and indicating the operations of said alarm.

26. In combination, an indicating primary register, and a locking register positively connected therewith, said locking register comprising means for arresting operation at predetermined counts and for giving an alarm at the time of such action.

27. In combination, an indicating primary register, and a locking register positively connected therewith, said locking register comprising means for arresting operation at predetermined counts and for giving an alarm.

28. In combination, an indicating primary register, and a locking register mechanically connected therewith, said locking register comprising means for arresting the mechanism against operation at predetermined counts.

29. In combination, locking mechanism, step-by-step mechanism, and cam mechanism and a follower therefor to coact to lock said step-by-step mechanism at predetermined counts.

30. In combination, locking mechanism, step-by-step mechanism, cam mechanism operated by said step-by-step mechanism, a follower for said cam mechanism to coact therewith to lock said step-by-step mechanism against operation, and a changeable units wheel associated with and controlling said follower.

31. In combination, locking mechanism therefor, step-by-step mechanism, cam mechanism operated by said step-by-step mechanism, a follower for said cam mechanism to coact therewith to lock said step-by-step mechanism against operation at predetermined counts, and a changeable units wheel associated with said follower to determine said intervals.

32. In a register locking mechanism, step-by-step mechanism, cam mechanism operated by said step-by-step mechanism, a follower for said cam mechanism to co-act therewith to lock said step-by-step mechanism against operation at predetermined counts, spring operated alarm mechanism, and step-by-step mechanism operated from said first named step-by-step mechanism for winding said alarm mechanism.

33. In a register locking mechanism, step-by-step mechanism, cam mechanism operated by said step-by-step mechanism, a follower for said cam mechanism to co-act therewith to lock said step-by-step mechanism against operation at predetermined counts, spring operated alarm mechanism, step-by-step mechanism operated from said first named step-by-step mechanism for winding said alarm mechanism, and means for releasing said second named step-by-step mechanism to sound said alarm.

34. In a register locking mechanism, in combination, a ratchet, means for rotating said ratchet, cam members rotated by connection with said ratchet, a locking follower for said cam members, spring operated alarm mechanism, a winding ratchet for the spring of said alarm mechanism, means whereby operation of said first named ratchet may operate said second named ratchet, a detent for said second named ratchet, a catch cam coöperating with said first named ratchet, and means whereby said catch cam may effect the withdrawal of said detent from said second named ratchet to sound the alarm.

35. In a register locking mechanism, in combination, an oscillating latch plate, a ratchet, pawls carried by said plate to advance said ratchet, a cam system operated by connection with said ratchet, a locking follower for said cam system, said follower being arranged to engage simultaneously in notches in said cam system at predetermined intervals, spring operated alarm mechanism, a dog whereby the oscillation of said latch plate rotates a ratchet to wind the spring of said alarm mechanism, a detent for said spring ratchet, and means connecting said detent and said follower so that engagement of said follower in the notches of said cam system may connect said detent with said latch plate to withdraw said detent from said spring ratchet to release the alarm mechanism.

36. In a register locking mechanism, in combination, an oscillating latch plate, a ratchet, pawls carried by said plate to advance said ratchet, a cam system operated by connection with said ratchet, a locking follower for said cam system, said follower being arranged to engage simultaneously in notches in said cam system at predetermined intervals, spring operated alarm mechanism, a dog whereby the oscillation of said latch plate rotates a ratchet to wind the spring of said alarm mechanism, a detent for said spring ratchet, means connecting said detent and said follower so that engagement of said follower in the notches of said cam system may connect said detent with said latch plate to withdraw said detent from said spring ratchet to release the alarm mechanism, and means for determining the time of said alarm and for withdrawing said follower from said cam system to restore the parts to their normal positions.

37. In combination, registering mechanism, means for dividing a series of registrations into blocks of different predetermined numbers, and means for locking said mechanism once for each block of registrations.

38. In combination, registering mechanism, means for dividing the registrations into blocks, interchangeable means for automatically determining the numbers of registrations in the blocks, and means for locking said mechanism once for each block of registrations.

39. In combination, registering mechanism, means for locking said mechanism against operation a predetermined number of times for a certain number of registrations, and interchangeable means for automatically determining the numbers of registrations between such locking points.

40. In combination, registering mechanism, means for giving an alarm a predetermined number of times for a certain number of registrations, and interchangeable means for automatically determining the number of registrations between such alarms.

41. In combination, registering mechanism, means for locking said mechanism against operation for a predetermined period a predetermined number of times for a certain number of registrations, interchangeable means for automatically determining the number of registrations between locking points, and means for giving an alarm in each of said periods.

42. In combination, a registering mechanism, operating means therefor, locking means for locking said registering mechanism, and means energized by said operating means for releasing said locking means.

43. In combination, a registering mechanism, operating means therefor, locking means actuated by said operating means, release means energized by said operating means for releasing said registering mechanism.

44. In combination, registering mechanism, operating means therefor, locking means acting after a predetermined number of actuations of said operating means for locking said registering mechanism and automatic releasing means for releasing said locking means, said releasing means being energized by said operating means.

45. In combination, a registering mechanism, operating means therefor, locking means acting after a predetermined number of actuations of said operating means for locking said registering mechanism and automatic releasing means for releasing said locking means after a predetermined interval, said releasing means being energized by said operating means.

46. In combination, a registering means, an operating means therefor, a locking means therefor, said locking means operating to lock said register at a predetermined count of said register and means operating automatically to release said locking means after a predetermined interval of time.

47. In combination, a registering means, an operating means therefor, a locking means for locking said registering means and said operating means upon a predetermined count of said register and means operable only after a predetermined interval of time for releasing said locking means.

48. In combination, registering means and an alarm means, said alarm means normally controlled by said registering means, and means actuated upon the registration of predetermined counts for placing said registering means under the control of said alarm means.

49. In combination, registering means and alarm means, said alarm normally controlled by said registering means and means for freeing said alarm and causing the same to control the operation of said registering means.

50. In combination, registering means and alarm means, said alarm normally controlled by said registering means and means for freeing said alarm and causing said alarm to control the operation of said registering means, said last means having automatic means for restoring the control of said registering means.

51. In combination, a registering mechanism, alarm mechanism, said registering mechanism releasing said alarm mechanism upon the registration of a predetermined count, and means to prevent further registration until said alarm has been operated.

In witness whereof, I hereunto subscribe my name this 18th day of October, A. D. 1909.

ARTHUR H. WOODWARD.

Witnesses:
 WM. G. KIRCHHOFF,
 ALBERT C. BELL.

Copies of this patent may be obtained for five cents each, by addressing the "Commissioner of Patents, Washington, D. C."